(12) United States Patent
Unno et al.

(10) Patent No.: US 11,882,308 B2
(45) Date of Patent: *Jan. 23, 2024

(54) IMAGE DECODING DEVICE, IMAGE ENCODING DEVICE, IMAGE PROCESSING SYSTEM, AND PROGRAM

(71) Applicant: KDDI CORPORATION, Tokyo (JP)

(72) Inventors: Kyohei Unno, Fujimino (JP); Kei Kawamura, Fujimino (JP); Sei Naito, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/179,900

(22) Filed: Mar. 7, 2023

(65) Prior Publication Data

US 2023/0209086 A1 Jun. 29, 2023

Related U.S. Application Data

(63) Continuation of application No. 17/860,485, filed on Jul. 8, 2022, now Pat. No. 11,627,336, which is a
(Continued)

(30) Foreign Application Priority Data

Sep. 21, 2018 (JP) .................. 2018-178101

(51) Int. Cl.
*H04N 19/57* (2014.01)
*H04N 19/105* (2014.01)
(Continued)

(52) U.S. Cl.
CPC ........... *H04N 19/57* (2014.11); *H04N 19/105* (2014.11); *H04N 19/176* (2014.11);
(Continued)

(58) Field of Classification Search
CPC ..... H04N 19/57; H04N 19/105; H04N 19/513
(Continued)

(56) References Cited

U.S. PATENT DOCUMENTS

| 2004/0252766 A1 | 12/2004 | Lee et al. |
| 2016/0286232 A1 | 9/2016 | Li et al. |
| 2021/0195227 A1* | 6/2021 | Lee ...................... H04N 19/513 |

FOREIGN PATENT DOCUMENTS

| EP | 3343924 A1 | 3/2017 |
| EP | 3547687 A2 | 2/2019 |

(Continued)

OTHER PUBLICATIONS

International Search Report issued in corresponding International Patent Application No. PCT/JP2019/034012 dated Nov. 19, 2019, with English translation.
(Continued)

*Primary Examiner* — Jeffery A Williams
(74) *Attorney, Agent, or Firm* — Troutman Pepper Hamilton Sanders LLP

(57) ABSTRACT

An image decoding device includes a prediction unit configured to generate a prediction signal included in a prediction block based on a motion vector. The prediction unit is configured to perform refinement processing of setting a search range based on a reference position specified by the motion vector, specifying a corrected reference position having the smallest predetermined cost from the search range, and correcting the motion vector based on the corrected reference position. When a block size of the prediction block is larger than a predetermined block size, the prediction unit is configured to divide the prediction block into sub-block groups and perform the refinement processing for each sub-block.

4 Claims, 9 Drawing Sheets

Related U.S. Application Data continuation of application No. 16/981,744, filed as application No. PCT/JP2019/034012 on Aug. 29, 2019, now Pat. No. 11,438,625.

(51) Int. Cl.
| | | |
|---|---|---|
| *H04N 19/513* | (2014.01) | |
| *H04N 19/176* | (2014.01) | |
| *H04N 19/182* | (2014.01) | |
| *H04N 19/52* | (2014.01) | |

(52) U.S. Cl.
CPC ......... *H04N 19/182* (2014.11); *H04N 19/513* (2014.11); *H04N 19/52* (2014.11)

(58) Field of Classification Search
USPC .................................................. 375/240.17
See application file for complete search history.

(56) References Cited

FOREIGN PATENT DOCUMENTS

| KR | 10-2004-0106202 A | 12/2004 |
|---|---|---|
| WO | 2018/110180 A1 | 6/2018 |

OTHER PUBLICATIONS

Liu, H., et al., "CE9-related: Simplification of Decoder Side Motion Vector Derivation" Joint Video Experts Team (JVET) of ITU0T SG 16 WP 3 and ISO/EDC JTC 1/SC 29/WG 11, 4 pages (Jul. 10-18, 2018) cited ISR submitted herewith.

Zhou, M., et al., "Non-CE9: A computational complexity analysis for DMVR" Joint Video Experts Team (JVET) of ITU-T SG 16 WP 3 and ISO/IEC JTC 1/SC 29/WG 11, 5 pages (Jul. 10-18, 2018) cited ISR submitted herewith.

Ueda, M., "Bi-prediction by single motion vector using decoder-side inter-reference ME" Joint Collaborative Team on Video-Coding (JCT-VC) of ITU-T SG16 WP3 and ISO/IEC JTC1/SC29/WG11, 22 pages (Mar. 16-23, 2011) cited ISR submitted herewith.

Unno, K., et al., "CE9:-related : DMVR with Coarse-to-Fine Search and Block Size Limit" Joint Video Experts Team (JVET) of ITU-T SG 16 WP 3 and ISO/IEC JTC 1/SC 29/WG 11, 5 pages (Oct. 3-12, 2018) cited ISR submitted herewith.

ITU-T H.265 v5 "Series H: Autiovisual and Multimedia Systems Infrastructure of audiovisual services—Coding of moving video High Efficiency Video Coding" International Telecommunication Union , 692 pages (Feb. 2018) cited in Specification.

Chen, J., et al. "Algorithm Description of Joint Exploration Test Model 7 (JEM 7)" Joint Video Exploration Team (JVET) of ITU-T SG 16 WP 3 and ISO/IEC JTC 1/SC 29/WG 11, 50 pages submitted (Jul. 13-21, 2017) cited in Specification.

S Chen et al., "Further Improvements to HMKTA-1.0" Qualcomm Incorporated, ITU—Telecommunications Standardization Sector (Jun. 19-26, 2015); pp. 1-8. K0041-vl.zip JVET-K0041-vl.docx.

Extended European Search Report for European Patent Application No. 19862930.5 dated Jun. 30, 2022.

Sethuraman et al., "Decoder Side MV Refinement/Derivation with CTB-Level Concurrency and Other Normative Complexity Reduction Techniques", Ittiam Systems Pvt. Ltd., Joint Video Experts Team (Jul. 10-18, 2018); pp. 1-8.

\* cited by examiner

IMAGE DECODING DEVICE, IMAGE ENCODING DEVICE, IMAGE PROCESSING SYSTEM, AND PROGRAM

CROSS REFERENCE TO RELATED APPLICATIONS

This is a continuation application of U.S. application Ser. No. 17/860,485 filed Jul. 8, 2022, which is a continuation application of Ser. No. 16/981,744 filed Sep. 17, 2020, issued as U.S. Pat. No. 11,438,625 and is a U.S. National Phase Application under 35 U.S.C. § 371 of International Patent Application No. PCT/JP2019/034012 filed Aug. 29, 2019, which claims priority of Japanese Patent Application No. 2018-178101, filed Sep. 21, 2018. The entire contents of the above are hereby incorporated by reference.

FIELD OF THE INVENTION

The present invention relates to an image decoding device, an image encoding device, an image processing system, and a program.

BACKGROUND

Conventionally, technologies (for example, High Efficiency Video Coding (HEVC)) for generating a prediction residual signal that is a difference between a prediction signal generated by intra prediction (intra-frame prediction) or inter prediction (inter-frame prediction) and an input image signal, and performing transform processing and quantization processing of the prediction residual signal have been proposed (for example, ITU-T H.265 High Efficiency Video Coding).

Among such image processing technologies, a technology (Decoder-side Motion Vector Refinement (DMVR)) in which an image decoding device refines a motion vector received from an image decoding device has also been proposed. Specifically, the image decoding device specifies a reference position based on the motion vector, and specifies a corrected reference position having the smallest predetermined cost from a search range set based on the specified reference position. The image decoding device corrects the motion vector based on the corrected reference position (for example, Algorithm Description of Joint Exploration Test Model 7 (JEM 7), JVET-G1001).

SUMMARY OF INVENTION

In the above-described image processing technology, a processing load for specifying the corrected reference position from the search range is large. Therefore, it is desired to reduce the processing load associated with correction of a motion vector without lowering correction accuracy of the motion vector.

Therefore, the present invention has been made in order to solve the above-described problem, and an object of the present invention is to provide an image decoding device, an image encoding device, an image processing system, and a program capable of reducing a processing load associated with correction of a motion vector without lowering correction accuracy of the motion vector.

An image decoding device according to the first aspect including: a prediction unit configured to generate a prediction signal included in a prediction block based on a motion vector, wherein the prediction unit is configured to perform refinement processing of setting a search range based on a reference position specified by the motion vector, specifying a corrected reference position having the smallest predetermined cost from the search range, and correcting the motion vector based on the corrected reference position; and when a block size of the prediction block is larger than a predetermined block size, the prediction unit is configured to divide the prediction block into sub-block groups and perform the refinement processing for each sub-block.

An image encoding device according to the second aspect including: a prediction unit configured to generate a prediction signal included in a prediction block based on a motion vector, wherein the prediction unit is configured to perform refinement processing of setting a search range based on a reference position specified by the motion vector, specifying a corrected reference position having the smallest predetermined cost from the search range, and correcting the motion vector based on the corrected reference position; and when a block size of the prediction block is larger than a predetermined block size, the prediction unit is configured to divide the prediction block into sub-block groups and performs the refinement processing for each sub-block.

An image processing system according to the third aspect including an image encoding device and an image decoding device, wherein the image encoding device and the image decoding device include a prediction unit configured to generate a prediction signal included in a prediction block based on a motion vector; the prediction unit is configured to perform refinement processing of setting a search range based on a reference position specified by the motion vector, specifying a corrected reference position having the smallest predetermined cost from the search range, and correcting the motion vector based on the corrected reference position; and when a block size of the prediction block is larger than a predetermined block size, the prediction unit divides the prediction block into sub-block groups and performs the refinement processing for each sub-block.

A program according to the fourth aspect that causes a computer to perform: a predicting step of generating a prediction signal based on a motion vector, wherein the predicting step includes a step of performing refinement processing of setting a search range based on a reference position specified by the motion vector, specifying a corrected reference position having the smallest predetermined cost from the search range, and correcting the motion vector based on the corrected reference position; and in the step, when a block size of the prediction block is larger than a predetermined block size, the prediction block is divided into sub-block groups and the refinement processing is performed for each sub-block.

According to one aspect, it is possible to provide an image decoding device, an image encoding device, an image processing system, and a program capable of reducing a processing load associated with correction of a motion vector without lowering correction accuracy of the motion vector.

DETAILED DESCRIPTION

Figure 1:
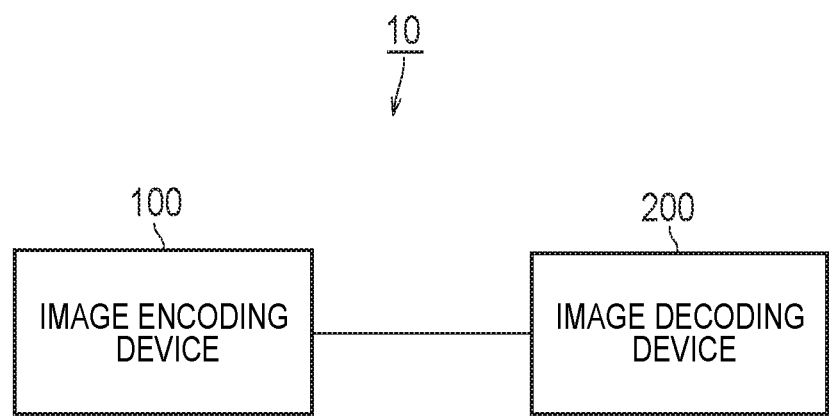
FIG. 1 is a diagram illustrating an image processing system 10 according to an embodiment.

Embodiments will be described below with reference to the drawings. In the following description of the drawings, the same or similar parts are denoted by the same or similar reference numerals.

However, it should be noted that the drawings are schematic and ratios of dimensions may be different from actual ones. Therefore, specific dimensions and the like should be determined in consideration of the following description. In addition, the drawings may include portions having different dimensional relationships or ratios.

An image decoding device according to a summary of the disclosure includes a prediction unit that generates a prediction signal included in a prediction block based on a motion vector. The prediction unit performs refinement processing of setting a search range based on a reference position specified by the motion vector, specifying a corrected reference position having the smallest predetermined cost from the search range, and correcting the motion vector based on the corrected reference position. In the refinement processing, the prediction unit performs first processing of calculating the predetermined cost for four first candidate positions that define an outer frame of a target search range constituting at least a part of the search range and the reference position, and second processing of specifying two second candidate positions that define an outer frame of a divided search range in which the target search range is divided and calculating the predetermined cost for the two second candidate positions, based on a criterion first candidate position and the reference position having the smallest predetermined cost of the four first candidate positions.

In the image decoding device according to the summary of the disclosure, the first processing of calculating the predetermined cost for the four first candidate positions that define the outer frame of the target search range is performed, and the second processing of specifying the two second candidate positions that define the outer frame of the divided search range in which the target search range is divided and calculating the predetermined cost for the two second candidate positions is performed. That is, by searching for the corrected reference position from outside the target search range, the corrected reference position can be appropriately searched while suppressing the number of pixels for which the predetermined cost is to be calculated. In other words, a processing load associated with correction of the motion vector can be reduced without lowering a correction accuracy of the motion vector.

The image encoding device according to the summary of the disclosure includes a prediction unit that generates a prediction signal included in a prediction block based on a motion vector. The prediction unit performs refinement processing of setting a search range based on a reference position specified by the motion vector, specifying a corrected reference position having the smallest predetermined cost from the search range, and correcting the motion vector based on the corrected reference position. In the refinement processing, the prediction unit performs first processing of calculating the predetermined cost for four first candidate positions that define an outer frame of a target search range constituting at least a part of the search range and the reference position, and second processing of specifying two second candidate positions that define an outer frame of a divided search range in which the target search range is divided and calculating the predetermined cost for the two second candidate positions, based on a criterion first candidate position and the reference position having the smallest predetermined cost of the four first candidate positions.

In the image encoding device according to the summary of the disclosure, the first processing of calculating the predetermined cost for the four first candidate positions that define the outer frame of the target search range is performed, and the second processing of specifying the two second candidate positions that define the outer frame of the divided search range in which the target search range is divided and calculating the predetermined cost for the two second candidate positions is performed. That is, by searching for the corrected reference position from outside the target search range, the corrected reference position can be appropriately searched while suppressing the number of pixels for which the predetermined cost is to be calculated. In other words, a processing load associated with correction of the motion vector can be reduced without lowering a correction accuracy of the motion vector.

As a summary of the disclosure, an image decoding method according to the operation of the image decoding device described above may be provided, and an image encoding method according to the operation of the image encoding device described above may be provided. As a summary of the disclosure, an image processing system including the image decoding device and the image encoding device described above may be provided. As a summary of the disclosure, a program according to the operation of the image decoding device described above may be provided, or a program according to the operation of the image encoding device described above may be provided.

Image Processing System

Hereinafter, an image processing system according to an embodiment will be described. FIG. 1 is a diagram illustrating an image processing system 10 according to an embodiment.

As illustrated in FIG. 1, an image processing system 10 includes an image encoding device 100 and an image decoding device 200. The image encoding device 100 generates encoded data by encoding an input image signal. The image decoding device 200 generates an output image signal by decoding the encoded data. The encoded data may be transmitted from the image encoding device 100 to the image decoding device 200 via a transmission path. The encoded data may be provided from the image encoding device 100 to the image decoding device 200 after being stored in a storage medium.

Image Encoding Device

Figure 2:
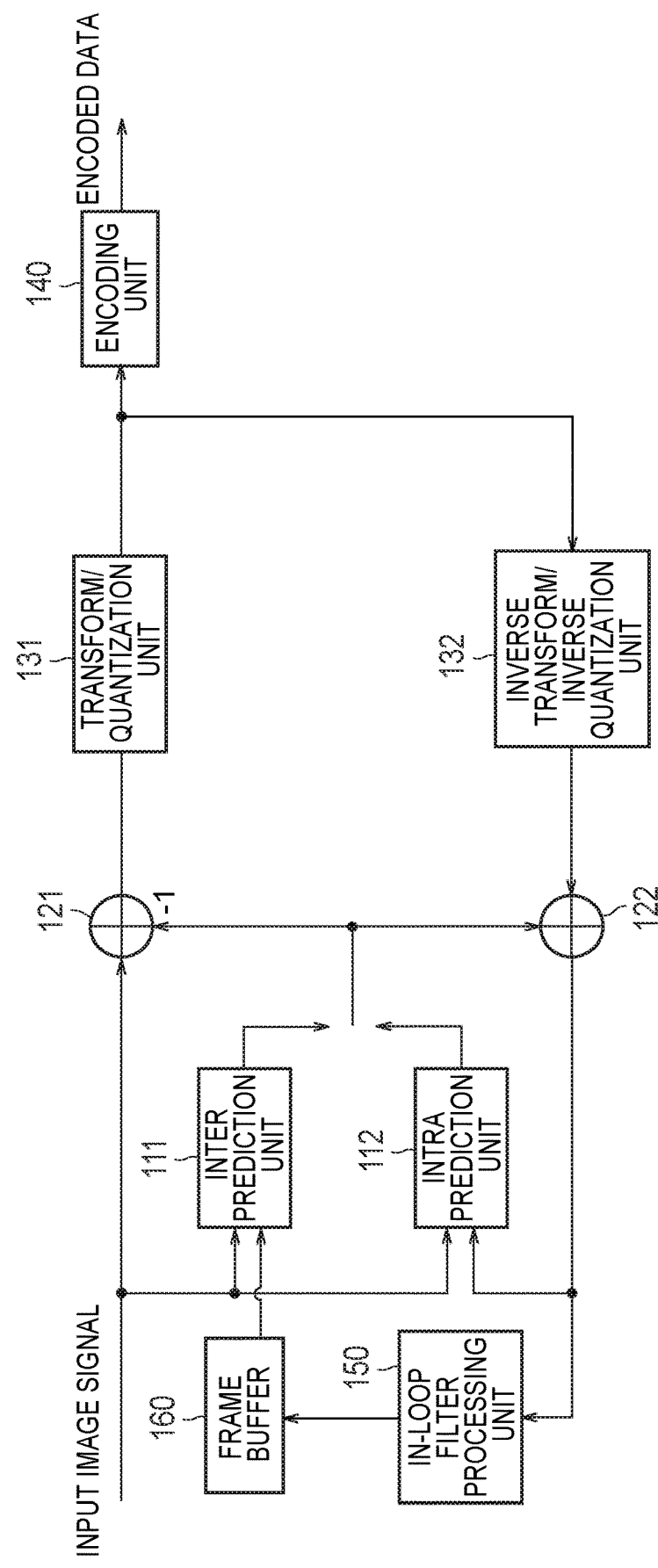
FIG. 2 is a diagram illustrating an image encoding device 100 according to an embodiment.

Hereinafter, the image encoding device according to the embodiment will be described. FIG. 2 is a diagram illustrating the image encoding device 100 according to the embodiment.

As illustrated in FIG. 2, the image encoding device 100 includes an inter prediction unit 111, an intra prediction unit 112, a subtractor 121, an adder 122, a transform/quantization unit 131, an inverse transform/inverse quantization unit 132, an encoding unit 140, an in-loop filter processing unit 150, and a frame buffer 160.

The inter prediction unit 111 generates a prediction signal by inter prediction (inter-frame prediction). Specifically, the inter prediction unit 111 specifies a reference block included in a reference frame by comparing a frame to be encoded (hereinafter, a target frame) with a reference frame stored in the frame buffer 160, and determines a motion vector for the specified reference block. The inter prediction unit 111 generates a prediction signal included in a prediction block for each prediction block based on the reference block and the motion vector. The inter prediction unit 111 outputs the prediction signal to the subtractor 121 and the adder 122. The reference frame is a frame different from the target frame.

The intra prediction unit 112 generates a prediction signal by intra prediction (intra-frame prediction). Specifically, the intra prediction unit 112 specifies a reference block included in a target frame, and generates a prediction signal for each prediction block based on the specified reference block. The intra prediction unit 112 outputs the prediction signal to the subtractor 121 and the adder 122. The reference block is a block that is referred to for a block to be predicted (hereinafter, a target block). For example, the reference block is a block adjacent to the target block.

The subtractor 121 subtracts the prediction signal from an input image signal, and outputs a prediction residual signal to the transform/quantization unit 131. Here, the subtractor 121 generates a prediction residual signal that is a difference between the prediction signal generated by intra prediction or inter prediction and the input image signal.

The adder 122 adds the prediction signal to the prediction residual signal output from the inverse transform/inverse quantization unit 132, and outputs a decoded signal before filtering to the intra prediction unit 112 and the in-loop filter processing unit 150. The decoded signal before filtering constitutes the reference block used in the intra prediction unit 112.

The transform/quantization unit 131 performs processing of transforming the prediction residual signal, and acquires a coefficient level value. Further, the transform/quantization unit 131 may perform quantization of the coefficient level value. The transform processing is processing of transforming the prediction residual signal into a frequency component signal. In the transform processing, a base pattern (transform matrix) corresponding to a discrete cosine transform (DCT) may be used, and a base pattern (transform matrix) corresponding to a discrete sine transform (DST) may be used.

The inverse transform/inverse quantization unit 132 performs inverse transform processing of the coefficient level value output from the transform/quantization unit 131. Here, the inverse transform/inverse quantization unit 132 may perform inverse quantization of the coefficient level value prior to the inverse transform processing. The inverse transform processing and the inverse quantization are performed in a procedure reverse to the transform processing and the quantization performed by the transform/quantization unit 131.

The encoding unit 140 encodes the coefficient level value output from the transform/quantization unit 131, and outputs encoded data. For example, encoding is entropy encoding that assigns codes of different lengths based on a probability of occurrence of the coefficient level value.

The encoding unit 140 encodes control data used in the decoding processing, in addition to the coefficient level value. The control data may include size data such as an encoded block size, a predicted block size, and a transformed block size.

The in-loop filter processing unit 150 performs filter processing on the decoded signal before filtering output from the adder 122, and outputs a decoded signal after filtering to the frame buffer 160. For example, the filtering processing is deblocking filtering processing that reduces distortion generated at a boundary between blocks (encoded block, predicted block, or transformed block).

The frame buffer 160 accumulates reference frames used by the inter prediction unit 111. The decoded signal after filtering constitutes the reference frame used by the inter prediction unit 111.

Inter Prediction Unit

Figure 3:
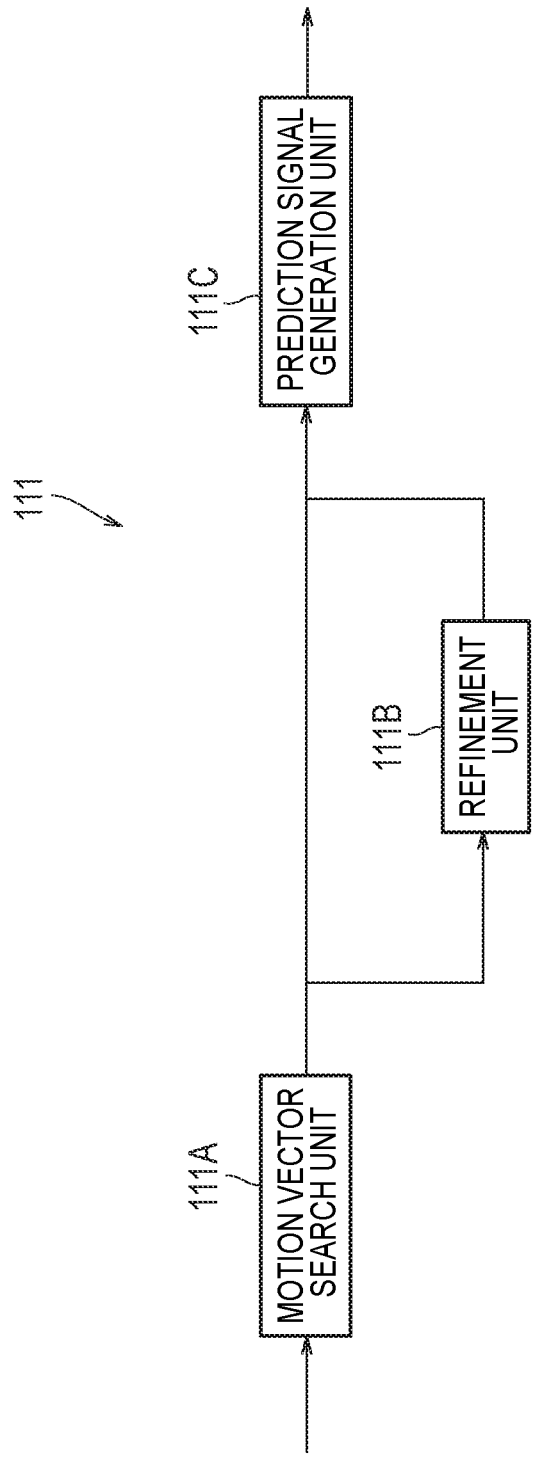
FIG. 3 is a diagram illustrating an inter prediction unit 111 according to an embodiment.

Hereinafter, the inter prediction unit according to the embodiment will be described. FIG. 3 is a diagram illustrating the inter prediction unit 111 according to the embodiment.

As illustrated in FIG. 3, the inter prediction unit 111 includes a motion vector search unit 111A, a refinement unit 111B, and a prediction signal generation unit 111C. The inter prediction unit 111 is an example of a prediction unit that generates a prediction signal included in a prediction block based on a motion vector.

The motion vector search unit 111A specifies a reference block included in the reference frame by comparing the target frame with the reference frame, and searches for the motion vector for the specified reference block. Since a known method can be adopted as a method of searching for the motion vector, details thereof are omitted.

The refinement unit 111B performs refinement processing of setting a search range based on a reference position specified by the motion vector, specifying a corrected reference position having the smallest predetermined cost from the search range, and correcting the motion vector based on the corrected reference position.

The refinement unit 111B may execute the refinement processing when a predetermined condition is satisfied. The predetermined condition may include a condition that the prediction block is a block that performs bidirectional prediction, one reference frame is a frame that is temporally earlier than the target frame, and the other reference frame is a frame that is temporally future than the target frame. The predetermined condition may include a condition that a block size of the prediction block is smaller than a predetermined size. The block size may be the number of pixels of the prediction block in a horizontal direction or the number of pixels of the prediction block in a vertical direction. The block size may be the smaller number of pixels in the horizontal direction and the vertical direction. The block size may be the total number of pixels in the block (that is, a value obtained by multiplying the number of pixels in the horizontal direction and the number of pixels in the vertical direction).

The predetermined condition may include a condition that the motion vector is encoded in a merge mode. The merge mode is a mode in which only an index of the motion vector of the encoded block adjacent to the prediction block is transmitted. The predetermined condition may include a condition that the motion vector is not applied with motion compensation prediction using an affine transformation.

In the embodiment, the refinement unit 111B performs refinement processing in the following procedure. Here, a case where displacements of motion vectors in a past direction and a future direction are linked to each other in the refinement processing will be exemplified. In other words, a sign of the displacement in the past direction is opposite to the sign of the displacement in the future direction. For example, when the displacement in the past direction is (−2,2), the displacement in the future direction is (2,−2).

Under such a premise, the predetermined cost is the sum of absolute values of differences between values of pixels included in the reference block (displaced) in the past direction and values of pixels included in the reference block (displaced) in the future direction. The difference is a difference between the values of the pixels existing at the positions corresponding to each other. Note that this is only an example, and if the index (value) can be calculated from the value of the pixel included in the reference block in the past direction and the value of the pixel included in the reference block in the future direction, such as the sum of squares of the difference, an index other than the above can be used as the predetermined cost.

Hereinafter, a case where the target search range is the same as the search range and the target search range is a range of integer pixels of ±2 in the horizontal direction and the vertical direction will be exemplified. The target search range has a square shape.

Firstly, the refinement unit 111B performs first processing of calculating a predetermined cost for four first candidate positions defining an outer frame (for example, four corners) of the target search range that constitutes at least a part of the search range, and a reference position.

Figure 4:
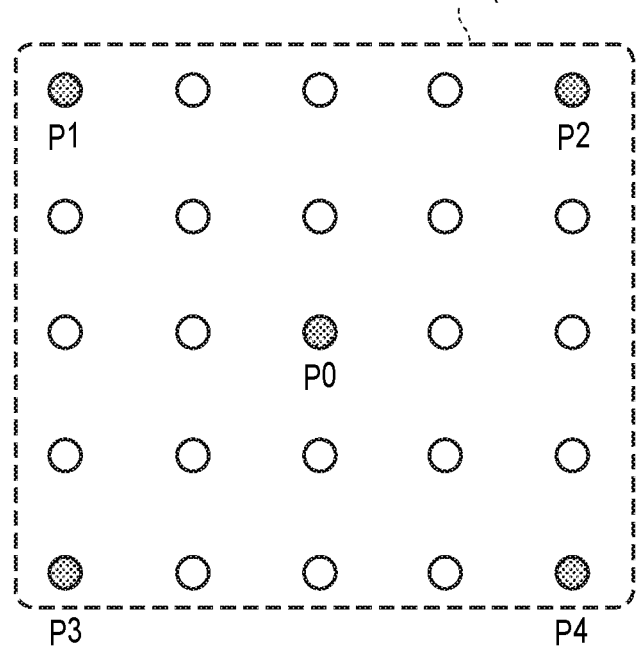
FIG. 4 is a diagram for describing first processing according to an embodiment.

Specifically, as illustrated in FIG. 4, the refinement unit 111B specifies the reference position (P0 in FIG. 4) based on the motion vector. The refinement unit 111B sets the target search range based on the reference position. The refinement unit 111B calculates the predetermined cost for the four first candidate positions (P1 to P4 in FIG. 4) defining the outer frame of the target search range, and the reference position (P0 in FIG. 4).

Secondly, the refinement unit 111B performs second processing of specifying two second candidate positions defining an outer frame (for example, four corners) of a divided search range in which the target search range is divided based on a criterion first candidate position having the smallest predetermined cost of the four first candidate positions and the reference position, and calculating a predetermined cost for the two second candidate positions.

Figure 5:
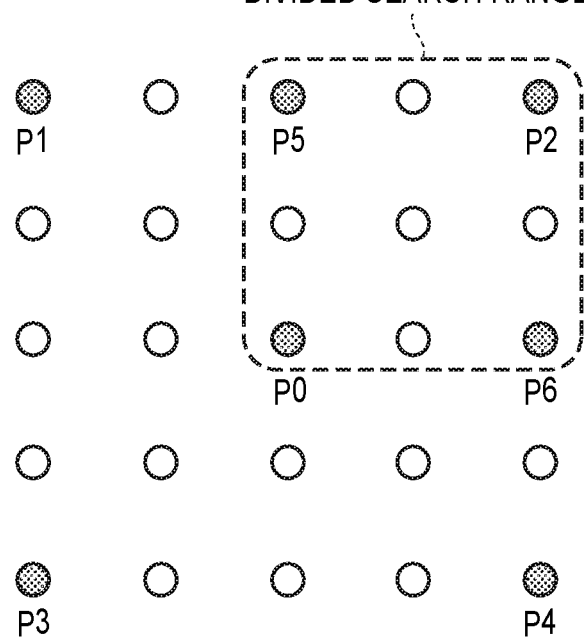
FIG. 5 is a diagram for describing second processing according to an embodiment.

Specifically, a case where the predetermined cost of P2 is the smallest is exemplified. In other words, P2 is the criterion first candidate position. As illustrated in FIG. 5, the refinement unit 111B specifies the divided search range in which the target search range is divided based on the criterion first candidate position (P2 in FIG. 5) and the reference position (P0 in FIG. 5). The divided target region has a square shape having a straight line from P0 to P2 as a diagonal line. The refinement unit 111B specifies two second candidate positions (P5 and P6 in FIG. 5) defining the outer frame of the divided search range, and calculates a predetermined cost for the two second candidate positions.

Here, the refinement unit 111B specifies a position having the smallest predetermined cost among the calculated candidate positions (P0, P2, P5, and P6) as a corrected reference position, and corrects (displaces) the motion vector based on the corrected reference position. However, in the embodiment, the refinement unit 111B continues the following processing.

Thirdly, the refinement unit 111B performs third processing of specifying a third candidate position based on a criterion second candidate position having a small predetermined cost of the four calculated candidate positions defining the outer frame (for example, four corners) of the divided search range, and calculating a predetermined cost for the third candidate position. Here, a case will be described in which two criterion second candidate positions are selected as the criterion second candidate position, and pixels arranged on a straight line sandwiched between the two criterion second candidate positions are specified as the third candidate position.

Figure 6:
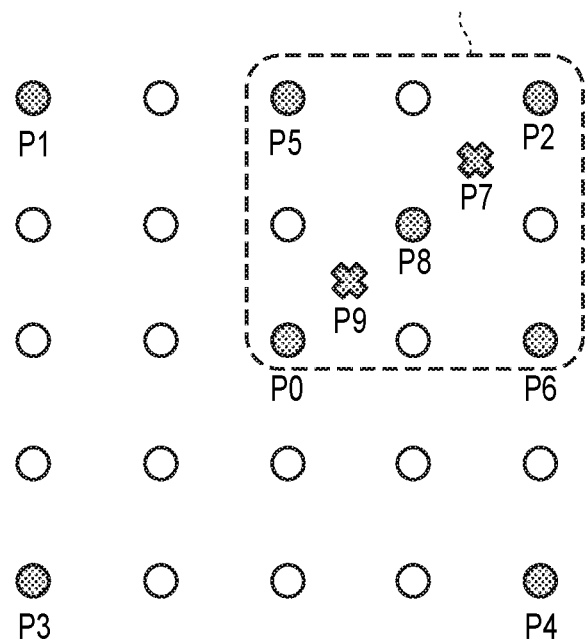
FIG. 6 is a diagram for describing third processing according to an embodiment.

For example, a case will be described in which two criterion second candidate positions (P0 and P2 in FIG. 6) are selected in ascending order of the predetermined cost among the four calculated candidate positions (P0, P2, P5, and P6 in FIG. 6) that define the outer frame of the divided search range as illustrated in FIG. 6. In such a case, the refinement unit 111B specifies pixels (P7, P8, and P9 in FIG. 6) arranged on a straight line sandwiched between the two criterion second candidate positions as the third candidate positions. The refinement unit 111B calculates a predetermined cost for the third candidate position (P7, P8, and P9 in FIG. 6). Here, P7 and P9 are ½ pixels and have values interpolated by integer pixels. That is, the third candidate position includes a ½ pixel.

Figure 7:
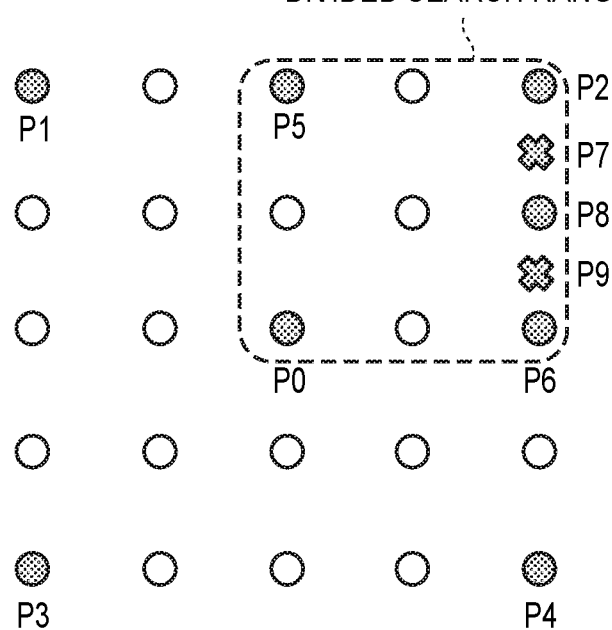
FIG. 7 is a diagram for describing the third processing according to the embodiment.

Alternatively, a case will be described in which two criterion second candidate positions (P0 and P6 in FIG. 7) are selected in ascending order of the predetermined cost among the four calculated candidate positions (P0, P2, P5, and P6 in FIG. 7) that define the outer frame of the divided search range as illustrated in FIG. 7. In such a case, the refinement unit 111B specifies pixels (P7, P8, and P9 in FIG. 7) arranged on a straight line sandwiched between the two criterion second candidate positions as the third candidate positions. The refinement unit 111B calculates a predetermined cost for the third candidate position (P7, P8, and P9 in FIG. 7). Here, P7 and P9 are ½ pixels and have values interpolated by integer pixels. That is, the third candidate position includes a ½ pixel.

The refinement unit 111B specifies a position having the smallest predetermined cost among the calculated candidate positions (P0, P2, P5 to P9) as a corrected reference position, and corrects (displaces) the motion vector based on the corrected reference position.

The prediction signal generation unit 111C generates a prediction signal based on the motion vector. Specifically, when the motion vector is not corrected, the prediction signal generation unit 111C generates the prediction signal based on the motion vector input from the motion vector search unit 111A. On the other hand, when the motion vector is corrected, the prediction signal generation unit 111C generates the prediction signal based on the corrected motion vector input from the refinement unit 111B.

Image Decoding Device

Figure 8:
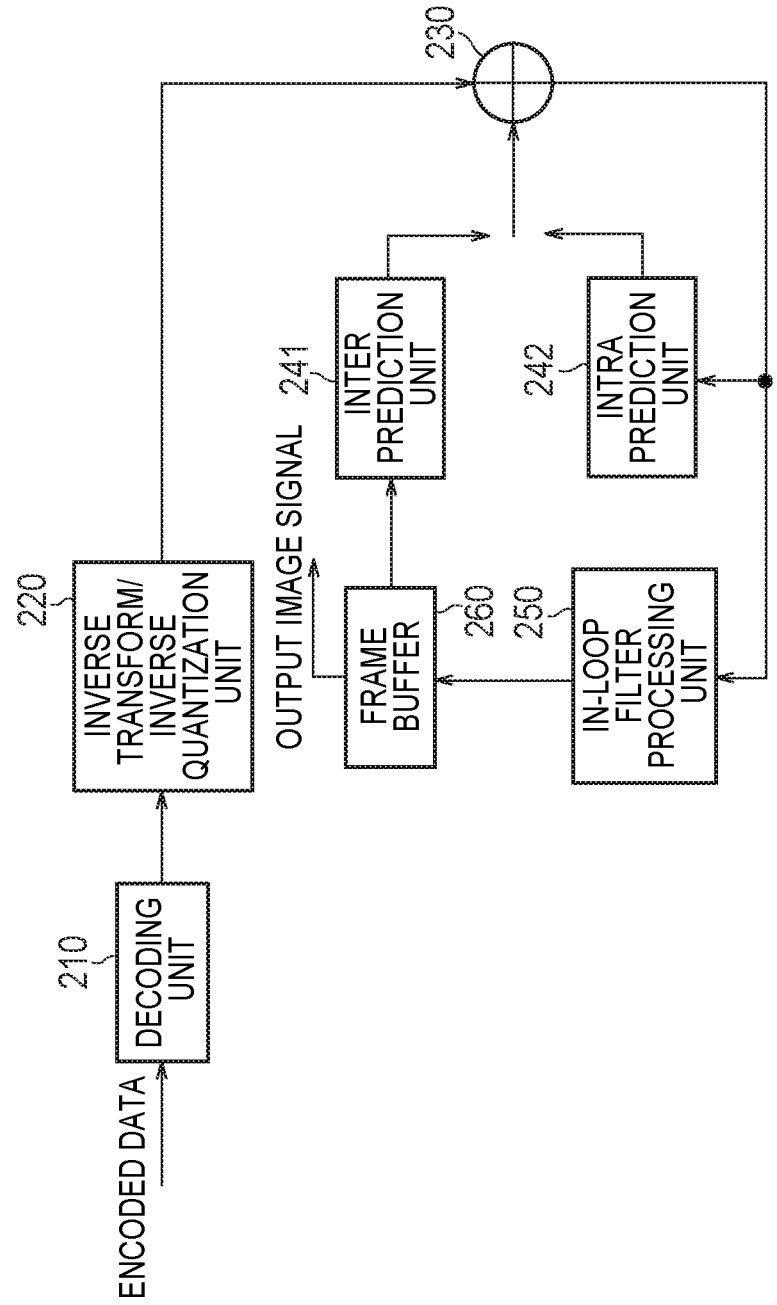
FIG. 8 is a diagram illustrating an image decoding device 200 according to an embodiment.

Hereinafter, the image decoding device according to the embodiment will be described. FIG. 8 is a diagram illustrating the image decoding device 200 according to the embodiment.

As illustrated in FIG. 8, the image decoding device 200 includes a decoding unit 210, an inverse transform/inverse quantization unit 220, an adder 230, an inter prediction unit 241, an intra prediction unit 242, an in-loop filter processing unit 250, and a frame buffer 260.

The decoding unit 210 decodes the encoded data generated by the image encoding device 100, and decodes the coefficient level value. For example, the decoding is entropy decoding in a procedure reverse to the entropy encoding performed by the encoding unit 140.

The decoding unit 210 may acquire control data by decoding the encoded data. As described above, the control data may include size data such as an encoded block size, a predicted block size, and a transformed block size. The control data may include an information element indicating an input source used to generate a predicted sample of a second component.

The inverse transform/inverse quantization unit 220 performs inverse transform processing of the coefficient level value output from the decoding unit 210. Here, the inverse transform/inverse quantization unit 220 may perform inverse quantization of the coefficient level value prior to the inverse transform processing. The inverse transform processing and the inverse quantization are performed in a procedure reverse to the transform processing and the quantization performed by the transform/quantization unit 131.

The adder 230 adds the prediction signal to the prediction residual signal output from the inverse transform/inverse quantization unit 220, and outputs a decoded signal before filtering to the intra prediction unit 262 and the in-loop filter processing unit 250. The decoded signal before filtering constitutes the reference block used in the intra prediction unit 262.

The inter prediction unit 241 generates a prediction signal by inter prediction (inter-frame prediction), similarly to the inter prediction unit 111. Specifically, the inter prediction unit 241 generates the prediction signal for each prediction block based on the motion vector decoded from the encoded data and the reference signal included in the reference frame. The inter prediction unit 241 outputs the prediction signal to the adder 230.

The intra prediction unit 262 generates a prediction signal by intra prediction (intra-frame prediction), similarly to the intra prediction unit 112. Specifically, the intra prediction unit 262 specifies a reference block included in a target frame, and generates the prediction signal for each prediction block based on the specified reference block. The intra prediction unit 262 outputs the prediction signal to the adder 230.

The in-loop filter processing unit 250 performs filter processing on the decoded signal before filtering output from the adder 230, and outputs a decoded signal after filtering to the frame buffer 260, similarly to the in-loop filter processing unit 150. For example, the filtering processing is deblocking filtering processing that reduces distortion generated at a boundary between blocks (encoded block, predicted block, or transformed block).

The frame buffer 260 accumulates reference frames used by the inter prediction unit 241, similarly to the frame buffer 160. The decoded signal after filtering constitutes the reference frame used by the inter prediction unit 241.

Inter Prediction Unit

Figure 9:
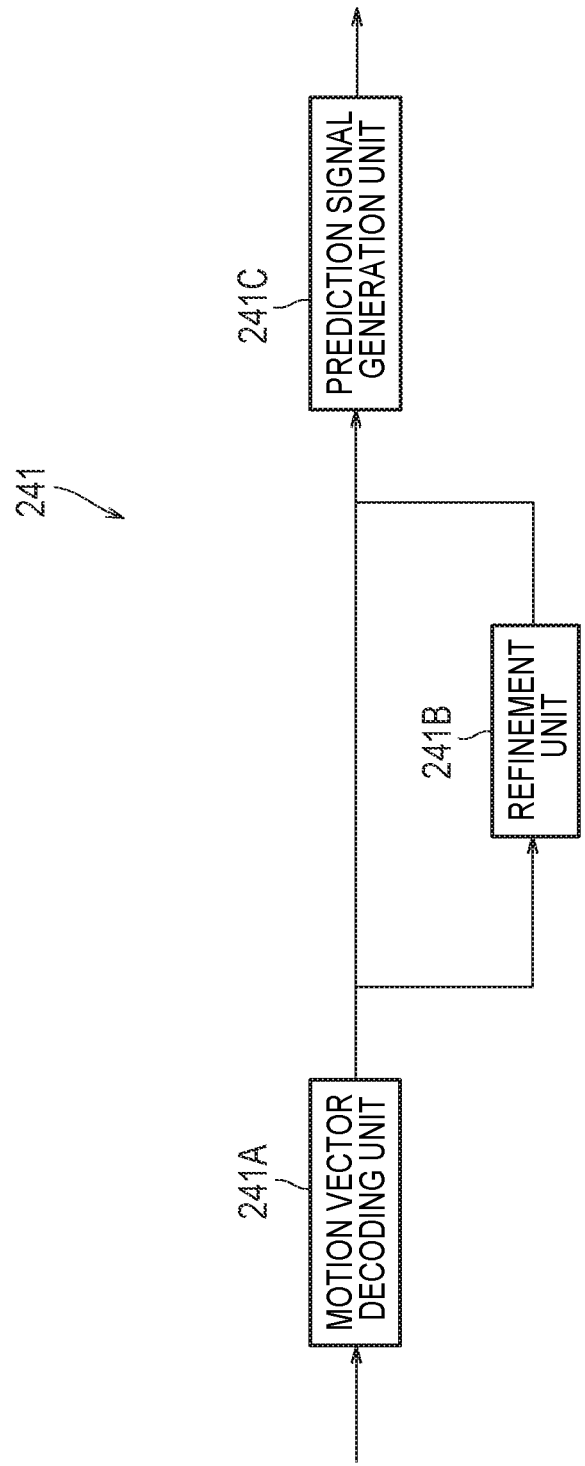
FIG. 9 is a diagram illustrating an inter prediction unit 241 according to an embodiment.

Hereinafter, the inter prediction unit according to the embodiment will be described. FIG. 9 is a diagram illustrating the inter prediction unit 241 according to the embodiment.

As illustrated in FIG. 9, the inter prediction unit 241 includes a motion vector decoding unit 241A, a refinement unit 241B, and a prediction signal generation unit 241C. The inter prediction unit 241 is an example of a prediction unit that generates a prediction signal included in a prediction block based on a motion vector.

The motion vector decoding unit 241A acquires the motion vector by decoding the control data received from the image encoding device 100.

The refinement unit 241B performs refinement processing of setting a search range based on a reference position specified by the motion vector, specifying a corrected reference position having the smallest predetermined cost from the search range, and correcting the motion vector based on the corrected reference position, similarly to the refinement unit 111B.

The prediction signal generation unit 241C generates a prediction signal based on the motion vector, similarly to the prediction signal generation unit 111C.

Action and Effect

In the image encoding device 100 and the image decoding device 200 according to the summary of the disclosure, the first processing of calculating the predetermined cost for the four first candidate positions that define the outer frame of the target search range is performed, and the second processing of specifying the two second candidate positions that define the outer frame of the divided search range in which the target search range is divided and calculating the predetermined cost for the two second candidate positions is performed. That is, by searching for the corrected reference position from outside the target search range, the corrected reference position can be appropriately searched while suppressing the number of pixels for which the predetermined cost is to be calculated. In other words, a processing load associated with correction of the motion vector can be reduced without lowering a correction accuracy of the motion vector.

In the image encoding device 100 and the image decoding device 200 according to the summary of the disclosure, following the first processing and the second processing, the third processing of specifying a third candidate position based on a criterion second candidate position having a small predetermined cost of the four calculated candidate positions defining the outer frame (for example, four corners) of the divided search range, and calculating a predetermined cost for the third candidate position is performed. The third candidate position is a pixel arranged on a straight line sandwiched between two criterion second candidate positions. That is, by calculating the predetermined cost only at the position where the predetermined cost is assumed to be small, the corrected reference position can be appropriately searched while suppressing the number of pixels for which the predetermined cost is to be calculated.

Modified Example 1

Hereinafter, Modified Example 1 of the embodiment will be described. In the following, differences from the embodiment will be mainly described.

The embodiment has exemplified the case in which the two criterion second candidate positions are selected as the criterion second candidate position as a result of the second processing. In contrast, a case will be described in which one criterion second candidate position is selected as the criterion second candidate position as a result of the second processing.

Specifically, the refinement unit (refinement unit 111B and refinement unit 241B) specifies a pixel adjacent to the reference position in the divided search range as the third candidate position when selecting the reference position as the criterion second candidate position in the third processing.

Figure 10:
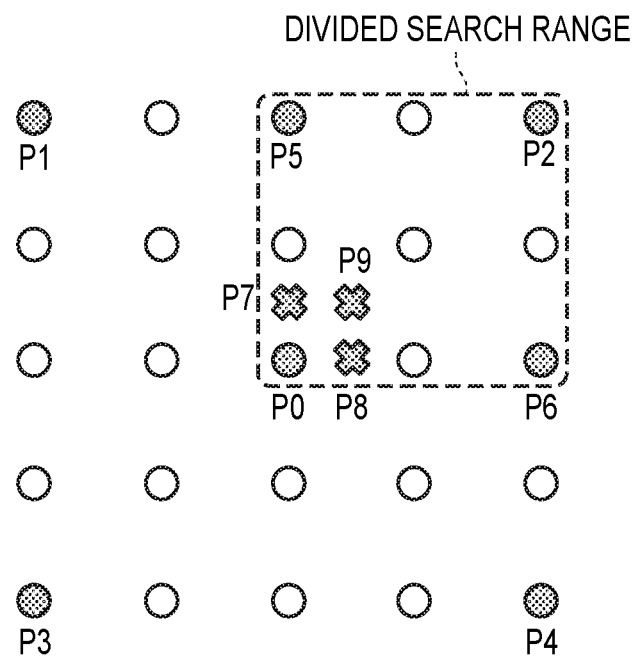
FIG. 10 is a diagram for describing third processing according to Modified Example 1.

For example, as illustrated in FIG. 10, when assuming a case in which the predetermined cost of P0 is smaller than a certain percentage (e.g., 50%) of the representative value (minimum value, maximum value or average value) of each predetermined cost of P2, P5, and P6, only the reference position (P0 in FIG. 9) may be selected as the criterion second candidate position. In such a case, the refinement unit specifies pixels (P7, P8, and P9 in FIG. 10) adjacent to the reference position in the divided search range as the third candidate position. Here, P7 to P9 are ½ pixels and have values interpolated by integer pixels. That is, the third candidate position includes a ½ pixel.

FIG. 10 illustrates a case where the third candidate position is a ½ pixel, but Modified Example 1 is not limited thereto. The third candidate position adjacent to the reference position in the divided search range may be an integer pixel.

Modified Example 2

Hereinafter, Modified Example 2 of the embodiment will be described. In the following, differences from the embodiment will be mainly described.

In the embodiment, the predetermined cost is calculated also for the ½ pixels (for example, P7 and P9 illustrated in FIG. 6) in the third processing. On the other hand, in Modified Example 2, the refinement unit (the refinement unit 111B and the refinement unit 241B) does not calculate the predetermined cost for the ½ pixels, but calculates the predetermined cost only for the integer pixels.

Figure 11:
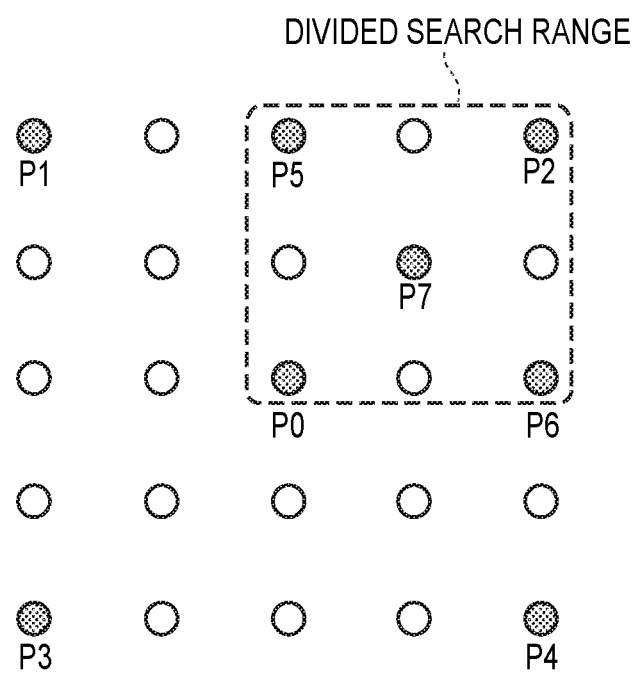
FIG. 11 is a diagram for describing third processing according to Modified Example 2.

For example, as illustrated in FIG. 11, when the predetermined costs of both P0 and P2 are smaller than a certain percentage (for example, 50%) of the representative value (minimum value, maximum value or average value) of the predetermined costs of P5 and P6, the cost of the ½ pixel may not be calculated, and the predetermined cost of the integer pixel (P7 in FIG. 11) may be calculated, on the straight line from P0 to P2. Alternatively, when the predetermined costs of both P5 and P6 are smaller than a certain percentage (for example, 50%) of the representative value (minimum value, maximum value or average value) of the predetermined costs of P0 and P2, the cost of the ½ pixel may not be calculated, and the predetermined cost of the integer pixel (P7 in FIG. 11) may be calculated, on the straight line from P5 to P6.

Modified Example 3

Hereinafter, Modified Example 3 of the embodiment will be described. In the following, differences from the embodiment will be mainly described.

The embodiment has exemplified the case in which the search range is the same as the target search range. On the other hand, in Modified Example 3, a case will be described in which the search range (for example, a range of ±4 integer pixels in the horizontal direction and the vertical direction) is larger than the target search range. In such a case, the refinement unit (the refinement unit 111B and the refinement unit 241B) performs processing of specifying the target search range from the search range in the refinement processing. Such processing is performed before the above-described first processing.

Figure 12:
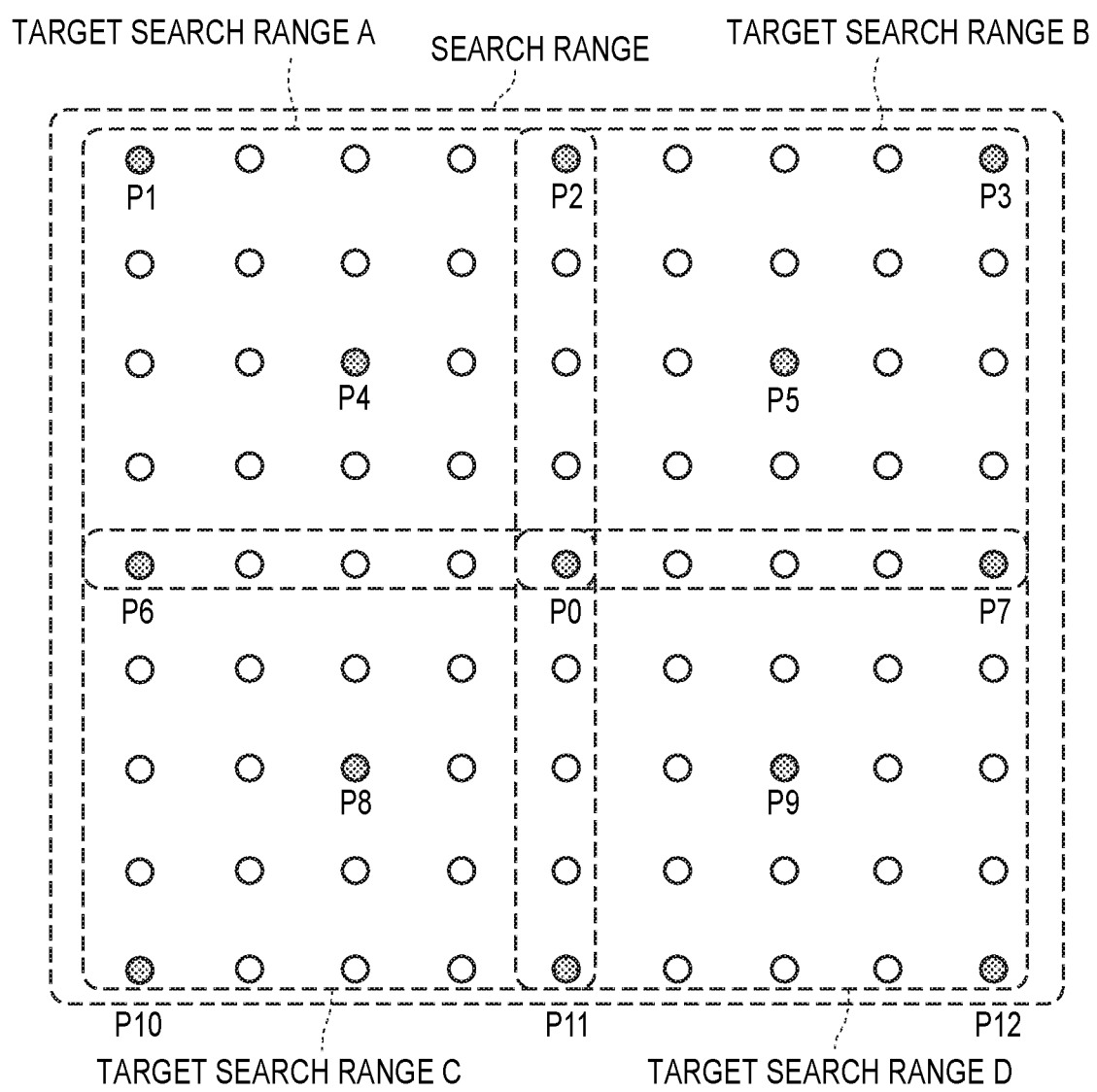
FIG. 12 is a diagram for describing a method of specifying a target search range according to Modified Example 3.

For example, as illustrated in FIG. 12, the refinement unit may divide the search range into target search ranges A to D and perform the same processing as in the embodiment for each target search range.

Alternatively, the refinement unit may specify the target search range having the smallest predetermined cost of the target search ranges A to D, and perform the same processing as in the embodiment for the specified target search range. The predetermined cost of the target search range may also be a predetermined cost of a representative point (for example, a center point (P4, P5, P8, and P9) or four corners (P1, P3, P10, and P12)) of each target search range. Alternatively, the predetermined cost of the target search range may also be robust to the predetermined costs of two or more extraction points (for example, P0, P1, P2, P4, and P6 in the case of the target search range A) of each target search range.

As described above, by specifying the target search range from the search range, the above-described embodiment can be applied to a case in which the search range is larger than the target search range. In other words, the above-described embodiment can be applied even when the search range is an integer pixel range of ±4 or more in the horizontal direction and the vertical direction.

Modified Example 4

Hereinafter, Modified Example 4 of the embodiment will be described. In the following, differences from the embodiment will be mainly described.

When the block size of the prediction block is larger than a predetermined block size, the prediction block may be divided into sub-block groups having a size smaller than the predetermined size, and the refinement processing of the motion vector may be performed for each sub-block. As a dividing method, a square may be divided into four parts, and the other may be divided into two parts.

Other Embodiments

Although the present invention has been described with reference to the above-described embodiments, it should not be understood that the descriptions and drawings constituting a part of the disclosure limit the present invention. Various alternative embodiments, examples, and operation techniques will be apparent to those skilled in the art from the disclosure.

In the embodiment, the case in which the target search range is a range of ±2 integer pixels in the horizontal direction and the vertical direction has been described. However, the embodiment is not limited thereto. The target search range may be a range of ±1 integer pixels in the horizontal and vertical directions. In such a case, the first processing and the second processing calculate the predetermined costs of all the integer pixels included in the divided search range. By the third processing, a predetermined cost of one ½ pixel selected among the five ½ pixel candidates is calculated. Alternatively, the target search range may be a range of ±3 integer pixels in the horizontal direction and the vertical direction.

In the embodiment, the case has been described in which the displacements of the motion vector in the past direction and the future direction are linked to each other in the refinement processing. However, the embodiment is not limited thereto. The displacements of the motion vector in the past direction and the future direction may not be linked to each other.

Although not specifically described in the embodiment, a program that causes a computer to execute each processing performed by the image encoding device 100 and the image decoding device 200 may be provided. The program may be recorded on a computer readable medium. If a computer-readable medium is used, the program can be installed on the computer. Here, the computer-readable medium on which the program is recorded may be a non-transitory recording medium. The non-transitory recording medium is not particularly limited, but may be a recording medium such as a CD-ROM or a DVD-ROM.

Alternatively, a chip configured by a memory that stores a program for executing each processing performed by the image encoding device 100 and the image decoding device 200 and a processor that executes the program stored in the memory may be provided.

What is claimed is:

1. An image decoding device comprising:
a prediction unit configured to generate a prediction signal included in a prediction block based on a motion vector, wherein
the prediction unit is configured to perform refinement processing of setting a search range based on a reference position specified by the motion vector, specifying a corrected reference position having the smallest predetermined cost from the search range, and correcting the motion vector based on the corrected reference position, when a predetermined condition is satisfied;
wherein, in the refinement processing, the prediction unit is configured to:
select first candidate positions from the search range;
select at least one second candidate position from the first candidate positions and the reference position;
select only the reference position as the second candidate position when the smallest predetermined cost of the reference position is smaller than a certain percentage of a minimum value of the first candidate positions, the certain percentage being a percentage other than 100% of the minimum value of the first candidate positions;
specify pixels adjacent to the second candidate position as third candidate positions, the third candidate position including half pixels having values interpolated by integer pixels; and
specify a position having the smallest predetermined cost from the first candidate positions, the second candidate position, the third candidate positions as the corrected reference position;
the predetermined condition including a condition that the prediction block is a block that performs bidirectional prediction, one reference frame is a frame that is temporally earlier than a target frame, and the other reference frame is a frame that is temporally future than the target frame;
a displacement between the first candidate position and the reference position in the one reference frame has a same absolute value with an opposite sign of a displacement between the first candidate position and the reference position in the other reference frame;
a displacement between the second candidate position and the reference position in the one reference frame has a same absolute value with an opposite sign of a displacement between the second candidate position and the reference position in the other reference frame;
a displacement between the third candidate position and the reference position in the one reference frame has a same absolute value with an opposite sign of a displacement between the third candidate position and the reference position in the other reference frame; and
when a block size of the prediction block is larger than a predetermined block size, the prediction unit is configured to divide the prediction block into sub-block groups and perform the refinement processing for each sub-block.

2. An image encoding device comprising:
a prediction unit configured to generate a prediction signal included in a prediction block based on a motion vector, wherein
the prediction unit is configured to perform refinement processing of setting a search range based on a reference position specified by the motion vector, specifying a corrected reference position having the smallest predetermined cost from the search range, and correcting the motion vector based on the corrected reference position, when a predetermined condition is satisfied;
wherein, in the refinement processing, the prediction unit is configured to:
select first candidate positions from the search range;
select at least one second candidate position from the first candidate positions and the reference position;
select only the reference position as the second candidate position when the smallest predetermined cost of the reference position is smaller than a certain percentage of a minimum value of the first candidate positions, the certain percentage being less than 100% of the minimum value of the first candidate positions;
specify pixels adjacent to the second candidate position as third candidate positions, the third candidate position including half pixels interpolated by integer pixels; and
specify a position having the smallest predetermined cost from the first candidate positions, the second candidate position, the third candidate positions as the corrected reference position;
the predetermined condition including a condition that the prediction block is a block that performs bidirectional prediction, one reference frame is a frame that is temporally earlier than a target frame, and the other reference frame is a frame that is temporally future than the target frame;
a displacement between the first candidate position and the reference position in the one reference frame has a same absolute value with an opposite sign of a displacement between the first candidate position and the reference position in the other reference frame;
a displacement between the second candidate position and the reference position in the one reference frame has a same absolute value with an opposite sign of a displacement between the second candidate position and the reference position in the other reference frame;
a displacement between the third candidate position and the reference position in the one reference frame has a same absolute value with an opposite sign of a displacement between the third candidate position and the reference position in the other reference frame; and
when a block size of the prediction block is larger than a predetermined block size, the prediction unit is configured to divide the prediction block into sub-block groups and performs the refinement processing for each sub-block.

3. An image processing system including an image encoding device and an image decoding device, wherein
   the image encoding device and the image decoding device include a prediction unit configured to generate a prediction signal included in a prediction block based on a motion vector;
   the prediction unit is configured to perform refinement processing of setting a search range based on a reference position specified by the motion vector, specifying a corrected reference position having the smallest predetermined cost from the search range, and correcting the motion vector based on the corrected reference position, when a predetermined condition is satisfied;
   wherein, in the refinement processing, the prediction unit is configured to:
      select first candidate positions from the search range;
      select at least one second candidate position from the first candidate positions and the reference position;
      select only the reference position as the second candidate position when the smallest predetermined cost of the reference position is smaller than a certain percentage of a minimum value of the first candidate positions, the certain percentage being less than 100% of the minimum value of the first candidate positions;
      specify pixels adjacent to the second candidate position as third candidate positions, the third candidate position including half pixels interpolated by integer pixels; and
      specify a position having the smallest predetermined cost from the first candidate positions, the second candidate position, the third candidate positions as the corrected reference position;
   the predetermined condition includes a condition that the prediction block is a block that performs bidirectional prediction, one reference frame is a frame that is temporally earlier than a target frame, and the other reference frame is a frame that is temporally future than the target frame;
   a displacement between the first candidate position and the reference position in the one reference frame has a same absolute value with an opposite sign of a displacement between the first candidate position and the reference position in the other reference frame;
   a displacement between the second candidate position and the reference position in the one reference frame has a same absolute value with an opposite sign of a displacement between the second candidate position and the reference position in the other reference frame;
   a displacement between the third candidate position and the reference position in the one reference frame has a same absolute value with an opposite sign of a displacement between the third candidate position and the reference position in the other reference frame; and
   when a block size of the prediction block is larger than a predetermined block size, the prediction unit divides the prediction block into sub-block groups and performs the refinement processing for each sub-block.

4. A program stored on a non-transitory computer-readable medium that causes a computer to perform:
   a predicting step of generating a prediction signal based on a motion vector, wherein
   the predicting step includes a step of performing refinement processing of setting a search range based on a reference position specified by the motion vector, specifying a corrected reference position having the smallest predetermined cost from the search range, and correcting the motion vector based on the corrected reference position, when a predetermined condition is satisfied;
   wherein, in the step of performing refinement processing, the program is configured to cause the computer to perform:
      selecting first candidate positions from the search range;
      selecting at least one second candidate position from the first candidate positions and the reference position;
      selecting only the reference position as the second candidate position when the smallest predetermined cost of the reference position is smaller than a certain percentage of a minimum value of the first candidate positions, the certain percentage being less than 100% of the minimum value of the first candidate positions;
      specifying pixels adjacent to the second candidate position as third candidate positions, the third candidate position including half pixels interpolated by integer pixels; and
      specifying a position having the smallest predetermined cost from the first candidate positions, the second candidate position, the third candidate positions as the corrected reference position;
   the predetermined condition includes a condition that the prediction block is a block that performs bidirectional prediction, one reference frame is a frame that is temporally earlier than a target frame, and the other reference frame is a frame that is temporally future than the target frame;
   a displacement between the first candidate position and the reference position in the one reference frame has a same absolute value with an opposite sign of a displacement between the first candidate position and the reference position in the other reference frame;
   a displacement between the second candidate position and the reference position in the one reference frame has a same absolute value with an opposite sign of a displacement between the second candidate position and the reference position in the other reference frame;
   a displacement between the third candidate position and the reference position in the one reference frame has a same absolute value with an opposite sign of a displacement between the third candidate position and the reference position in the other reference frame; and
   in the step of performing refinement processing, when a block size of the prediction block is larger than a predetermined block size, the prediction block is divided into sub-block groups and the refinement processing is performed for each sub-block.

* * * * *